Oct. 19, 1943.                C. G. ANASTOR ET AL                2,332,361
                         APPARATUS FOR MAKING BEADS
                        Filed June 16, 1941        3 Sheets-Sheet 1

Inventors
Charles G. Anastor
Kenneth M. Henry
By Charles B. Belknap
Attorney

Oct. 19, 1943.  C. G. ANASTOR ET AL  2,332,361
APPARATUS FOR MAKING BEADS
Filed June 16, 1941  3 Sheets-Sheet 3

Inventors
Charles G. Anastor
Kenneth M. Henry
By Charles B. Belknap
Attorney

Patented Oct. 19, 1943

2,332,361

UNITED STATES PATENT OFFICE 2,332,361

APPARATUS FOR MAKING BEADS

Charles G. Anastor and Kenneth M. Henry, Vineland, N. J., assignors to Kimble Glass Company, Vineland, N. J., a corporation of Illinois Application June 16, 1941, Serial No. 398,334

1 Claim. (Cl. 49—7)

The present invention relates to an apparatus for making beads from plastics. More particularly the invention pertains to means for melting glass rod from which relatively small gobs of molten glass drop and mechanism for tumbling and cooling the separated molten glass to produce spherical glass bodies.

The invention will be more fully understood from the following description thereof taken with the accompanying drawings illustrating a preferred embodiment of apparatus for carrying out the process.

In the drawings—

Figure 1:
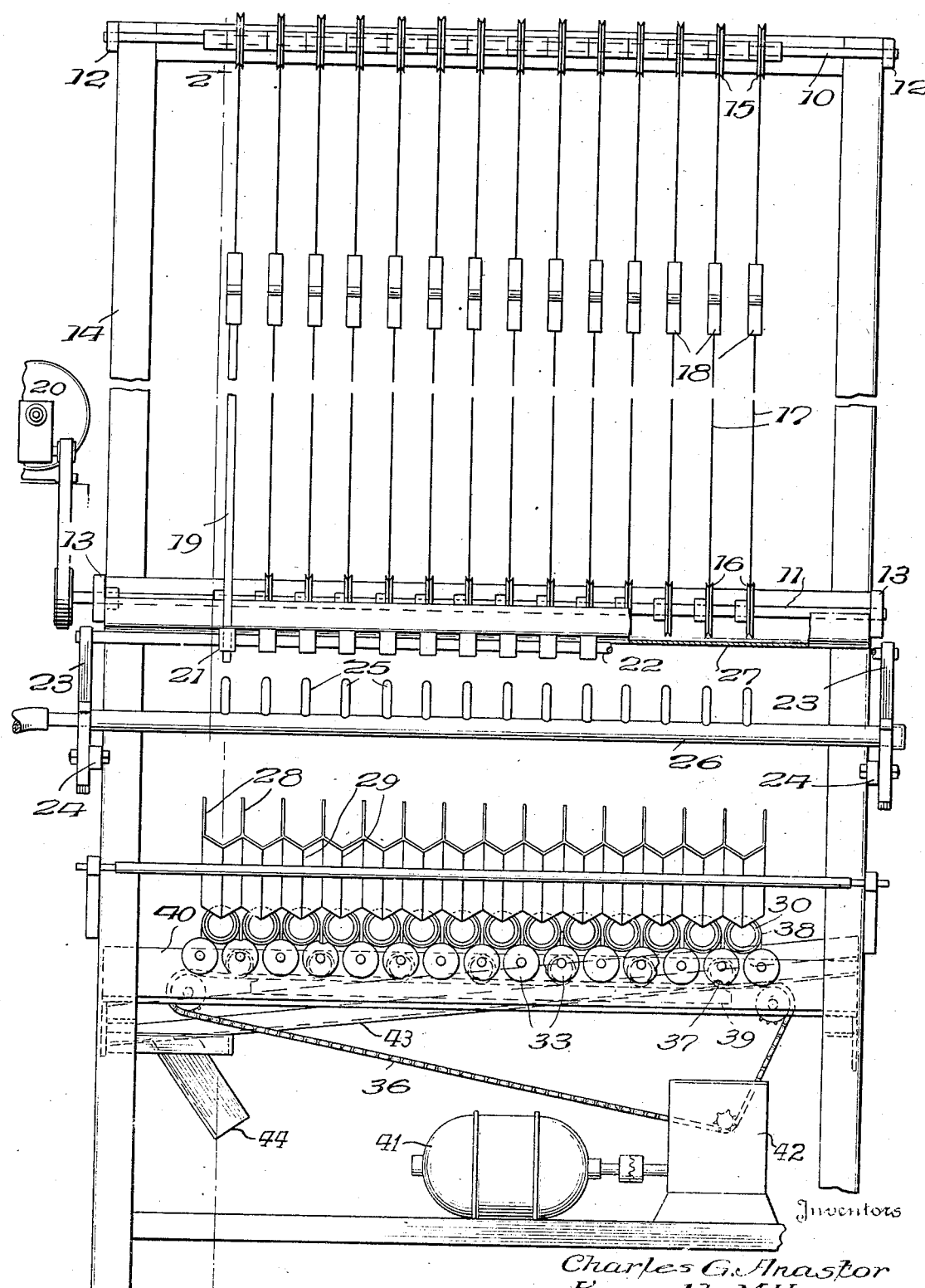
Fig. 1 is a front elevational view of the apparatus.
Figure 2:
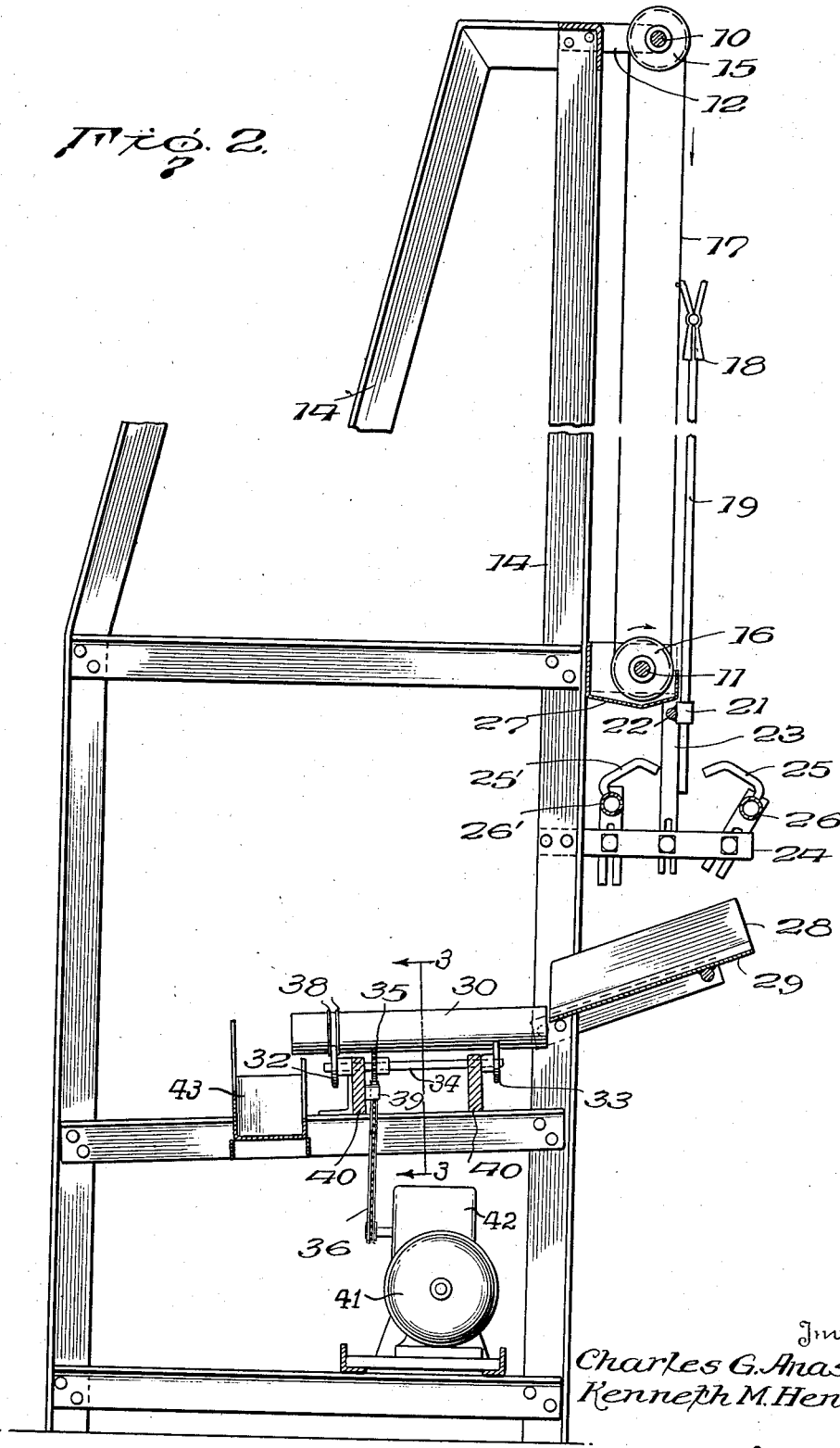
Fig. 2 is a section taken on line 2—2 of Fig. 1.
Figure 3:
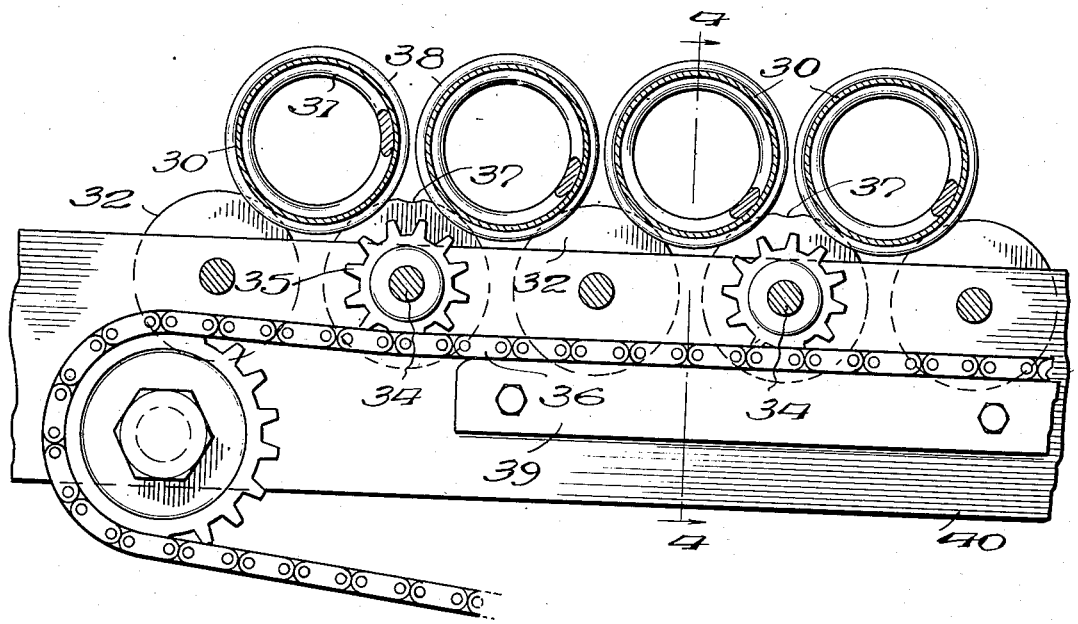
Fig. 3 is an enlarged fragmentary section taken on line 3—3 of Fig. 2.

Referring to the drawings, it will be seen that spaced parallel shafts 10 and 11 are journaled in upper brackets 12 and lower brackets 13 secured to frame 14. Fast on shaft 10 are pulleys 15 spaced along the shaft while similarly spaced pulleys 16 are secured to shaft 11. Endless belts 17, which may be metallic cord, wire, or other suitable material, pass over the pulleys and are driven at the same speed, shaft 11 being driven by a suitable motor 20. Connected to each wire is a spring-closed clamp 18 adapted to grip the upper end of a glass rod 19 and support the rod vertically as it is lowered. Tubular members 21 guide the lower ends of the rods, these members being fixed to bar 22 supported by uprights 23 which are adjustably secured to brackets 24 on the frame.

A series of burners 25, 25' extending from manifolds 26, 26' and inclined downwardly with respect to the glass rods 19 are arranged in pairs, each pair being positioned in alignment with a glass rod so that the flames are directed on the lower ends of the glass rods. The manifolds are adjustably mounted on brackets 24. A shield 27 protects pulleys 16 from the heat of the burners and catches fragments dropped during change over of the rods.

Positioned beneath each glass rod is an inclined chute 28 having a V-shaped bottom 29 into which gobs of molten glass falling from the ends of rods 19 drop. It is to be understood that pulleys 16 are rotated at a relatively low speed and that the intensity of the flames is such that, as the ends of the rods melt, substantially uniformly sized gobs separate from the rods and drop into the chutes. The downwardly directed flames aid separation of the gobs. The molten gobs roll from the chutes into continuously revolving cylinders 30, one of which is shown in section in Fig. 4.

Figure 4:
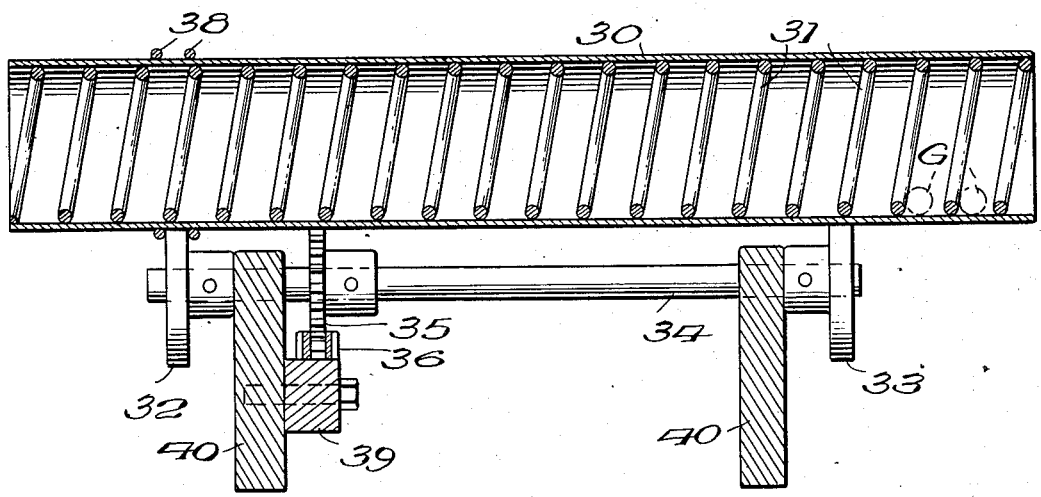
Fig. 4 is a longitudinal section of a shaping and cooling cylinder employed in the process taken on line 4—4 of Fig. 3.

Each cylinder is provided interiorly thereof with a helical abutment 31, shown in Fig. 4 as a wire soldered or welded to the inner surface of the cylinder and contiguous to said surface. The cylinders are inclined rearwardly and each is supported at each end thereof by a pair of adjacent spaced discs 32, 33 on shafts 34, the latter having fast thereon sprockets 35 driven by chain 36. It is to be noted that each of the alternate discs 33 is provided with a peripheral depression 37 so that the discs not only cause the cylinders 31 to revolve, but also jar the cylinder slightly as they turn. Each cylinder 31 is provided with a pair of spaced annular flanges 38 cooperating with the rear discs to prevent the cylinders from sliding off their supports. The upper reach of chain 36 is guided by means of a way 39 on bearing plates 40 to insure engagement of the chain with all of the sprockets 35, the chain being driven by motor 41 through reduction gearing in housing 42. Collecting and discharge chutes 43, 44 convey the solidified glass beads to a suitable receptacle.

From the foregoing description of the apparatus it will be apparent that the glass rods are lowered at a speed to permit the ends thereof to be melted and that, when a relatively short length at the end of each rod is melted sufficiently, a gob of soft glass will be separated from the end of each rod and drop by gravity into one of the chutes. The rods are lowered progressively so that successive increments of the rod are melted to form the gobs. As the gobs, indicated at G, fall into the revolving cylinders they are relatively hot and soft. Their progress through the cylinders is impeded by the helical abutments in the cylinders which, however, permit progressive advancement of the gobs through the cylinders. Since the cylinders are revolving, the gobs are rolled over and over, or tumbled, tending thereby to assume a spherical shape. At the same time they are cooled during their passage through the cylinders and are solid when discharged therefrom. In this manner substantially spherical glass beads, uniform in size, are produced continuously, automatically, and inexpensively.

While a preferred form of the invention has been illustrated and described, it is not intended that the invention be limited to the details shown, but may be modified within the definition thereof as set forth in the appended claim.

Having described our invention, what we claim as new and desire to secure by Letters Patent is:

Apparatus for producing glass beads, comprising means for vertically supporting a glass rod, heating means for melting the lower end of the rod to separate a gob of molten glass therefrom, means for progressively effecting relative movement of said rod and said heating means axially of said rod, a cylinder for tumbling and cooling the separated gob, and means for rotating and jarring said cylinder.

CHARLES G. ANASTOR.
KENNETH M. HENRY.